United States Patent
Baker

(10) Patent No.: US 8,266,884 B1
(45) Date of Patent: Sep. 18, 2012

(54) ASYNCHRONOUS COMBUSTION SYSTEM

(76) Inventor: Mark Baker, Wylie, TX (US)

( * ) Notice: Subject to any disclaimer, the term of this patent is extended or adjusted under 35 U.S.C. 154(b) by 692 days.

(21) Appl. No.: 12/398,173

(22) Filed: Mar. 4, 2009

(51) Int. Cl.
  F02C 5/00 (2006.01)
  F02C 7/00 (2006.01)
  F02G 1/00 (2006.01)
  F02G 3/00 (2006.01)

(52) U.S. Cl. ................................ 60/39.6; 60/39.53

(58) Field of Classification Search .......... 60/39.53, 60/39.6, 605.2
  See application file for complete search history.

(56) References Cited

U.S. PATENT DOCUMENTS

| | | | | |
|---|---|---|---|---|
| 2,611,240 A * | 9/1952 | Patterson | | 60/39.3 |
| 4,041,698 A * | 8/1977 | Moritz | | 60/39.52 |
| 4,369,623 A * | 1/1983 | Johnson | | 60/39.6 |
| 4,476,817 A * | 10/1984 | Lindberg | | 123/3 |
| 4,541,367 A * | 9/1985 | Lindberg | | 123/25 M |
| 5,065,579 A * | 11/1991 | Monahan | | 60/524 |
| 5,311,739 A * | 5/1994 | Clark | | 60/39.6 |
| 5,672,187 A * | 9/1997 | Rock et al. | | 95/219 |
| 5,946,903 A * | 9/1999 | Marquard | | 60/39.6 |
| 6,032,460 A * | 3/2000 | Pahl | | 60/39.6 |
| 6,340,013 B1 * | 1/2002 | Britton | | 123/255 |
| 6,408,613 B1 * | 6/2002 | Shaw | | 60/39.6 |
| 6,490,854 B2 * | 12/2002 | Mehail | | 60/39.6 |
| 6,698,183 B1 * | 3/2004 | Thordarson | | 60/39.6 |
| 7,823,385 B2 * | 11/2010 | McEwen et al. | | 60/602 |
| 2003/0014959 A1 * | 1/2003 | Ginter | | 60/39.26 |
| 2003/0226392 A1 * | 12/2003 | Naumiec et al. | | 73/1.71 |
| 2004/0148925 A1 * | 8/2004 | Knight | | 60/259 |
| 2005/0016255 A1 * | 1/2005 | Naumiec et al. | | 73/1.71 |
| 2005/0126155 A1 * | 6/2005 | Thordarson | | 60/39.6 |
| 2006/0254278 A1 * | 11/2006 | Schoell | | 60/670 |
| 2007/0199299 A1 * | 8/2007 | Kashmerick | | 60/39.6 |
| 2007/0209363 A1 * | 9/2007 | McEwen et al. | | 60/602 |
| 2010/0095682 A1 * | 4/2010 | Evans-Beauchamp | | 60/783 |
| 2010/0095915 A1 * | 4/2010 | Evans-Beauchamp | | 123/68 |

* cited by examiner

*Primary Examiner* — Thomas Denion
*Assistant Examiner* — Cameron Setayesh
(74) *Attorney, Agent, or Firm* — Law Office of J. D. Pemberton; John Pemberton

(57) ABSTRACT

A device and method that converts the high temperature produced by combustion into a fluid volume of high pressure gas without requiring a boiler or heat exchanger. By injecting a fluid directly into a combustion system, heat energy that may otherwise be wasted is converted directly into high pressure gas.

18 Claims, 6 Drawing Sheets

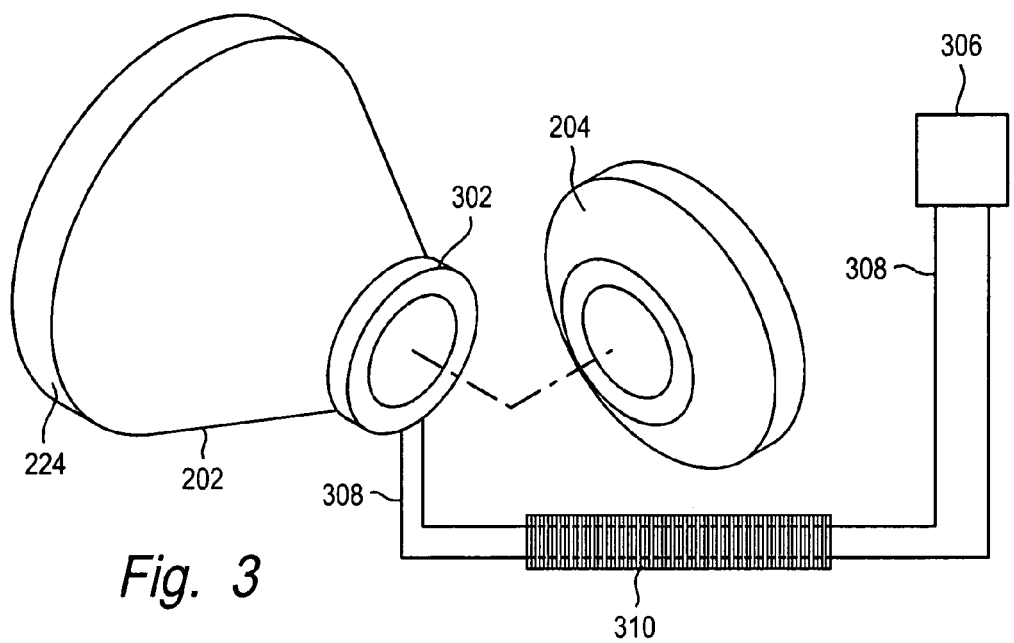
Fig. 3
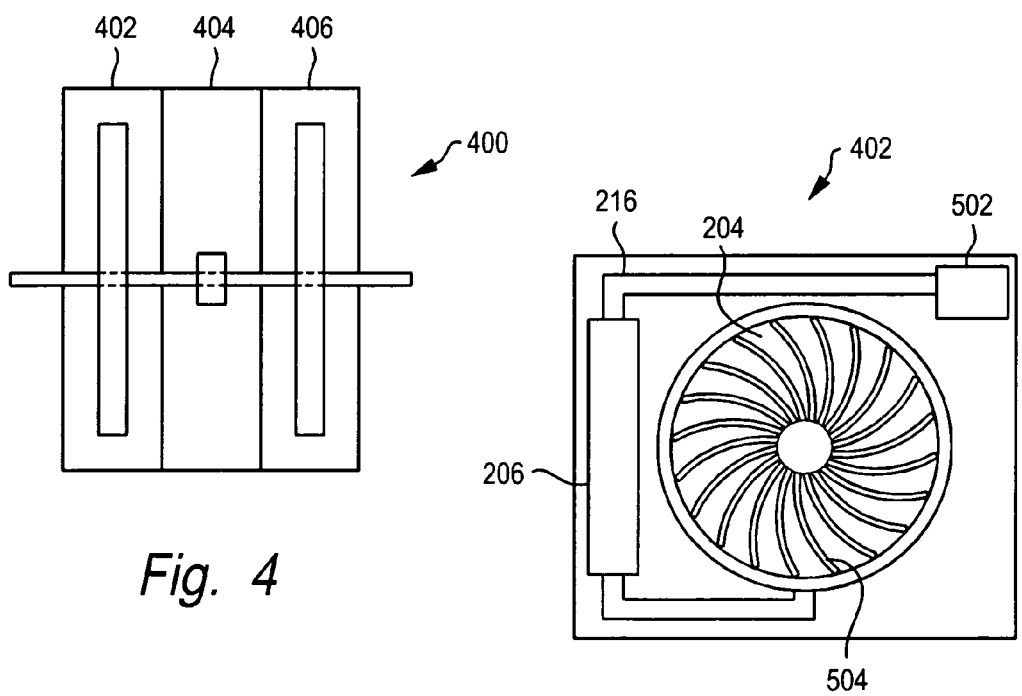
Fig. 4
Fig. 5

ASYNCHRONOUS COMBUSTION SYSTEM

BACKGROUND OF THE INVENTION

1. Technical Field

This invention relates to internal combustion engines, and more particularly, to the combustion of an internal combustion engine.

2. Description of Related Art

In a typical combustion engine, fuel and air are mixed in a combustion chamber and the fuel and air mixture is combusted. The leftover hot gases produced by this combustion tend to occupy a far greater volume than the original fuel, thus creating an increase in pressure within the limited volume of the combustion chamber. The pressure can be used to do work, for example, to move a piston on a crankshaft or rotate the blades of a turbine. The energy can be converted to various types of motion or to produce thrust when directed out of a nozzle as in a rocket or jet engine.

For example, a reciprocating engine, also known as a piston engine, is a heat engine that uses one or more pistons to convert pressure into a rotating motion. There may be one or more pistons and each piston is enclosed inside a cylinder or combustion chamber. Gas is introduced into the combustion chamber, either already hot and under pressure such as in a steam engine, heated inside the cylinder either by ignition of a fuel air mixture such as in an internal combustion engine, or by contact with a hot heat exchanger in the cylinder. As the hot gases expand, pressure pushes the piston to the bottom of the cylinder or combustion chamber. The piston is returned to the cylinder top either by a flywheel or by the power from other pistons connected to the same shaft and the cycle starts again. Typically, the expanded or "exhausted" gases are removed from the cylinder by this stroke.

SUMMARY OF INVENTION

An asynchronous combustion system (ACS) and method of use improves the efficiency of internal combustion engines by supplying high-pressure gas to a power transfer system. The ACS is an external combustion system that utilizes the heat energy typical lost in internal combustion engines such as four cycle, two cycle, turbine, and rotary engines.

More specifically, the ACS converts the high temperature produced by combustion into a fluid volume of high pressure gas without requiring a boiler or heat exchanger. By injecting a fluid directly into a combustion system, heat energy that may otherwise be wasted is converted directly into high pressure gas. The conversion of the liquid into a gas is a high volumetric expansion ratio and follows the ideal gas law $V=nRT/P$. Because the ACS is an external combustion system, the combustion process can be controlled, without dependence on the operating conditions of the machine utilizing the ACS.

The ACS contains a combustion system, high pressure chamber, regulated pressure chamber, and a power transfer system. The combustion system generates a high pressure hot gas and transfers the high pressure hot gas to the high pressure chamber. The high pressure chamber stores a large capacity of the high pressure hot gas generated by the combustion system and functions as the source of the high pressure gas contained in the regulated pressure chamber. The power transfer system uses the high pressure gas contained in the regulated pressure chamber to operate a machine associated with the ACS. The machine may be a vehicle such as an automobile, tractor, boat, train, or airplane or the machine may be stationary machinery such as a generator or pump.

The pressure of the gas in the high pressure chamber is regulated by a regulator and monitored by a main controller that monitors and controls the operation of the ACS. When the pressure in the high pressure chamber falls below a minimum required value, the main controller initiates an ignition sequence that allows compressed air to flow into the combustion chamber. During the same sequence, the main controller allows a controlled amount of fuel to flow into the combustion chamber and the main controller controls the operation and timing of the ignition. In addition, the main controller controls a second valve such that the combusted gas in combustion chamber is allowed to flow into the high pressure chamber so the high pressure chamber contains a constant source of high pressure gas that is greater than the pressure in the regulated chamber.

The combustion system generally contains an air intake, compressor, pre-combustion air chamber, combustion fuel source, and a combustion chamber. During use, air is drawn into the combustion system via an air intake. The compressor compresses the received air and delivers the compressed air to the pre-combustion air chamber. The pressure level in the pre-combustion air chamber is monitored by the main controller such that once the pressure level in the pre-combustion air chamber has reached a predetermined level, a waste gate or clutch on the compressor shaft is activated to reduce the load on the compressor.

The main controller also controls a first valve wherein the first valve allows the high pressure gas contained in the pre-combustion air chamber to flow into the combustion chamber. The fuel flow into the combustion chamber is also controlled by the main controller. Because the compressed air is admitted into the combustion chamber through the first valve, in contrast to a four stroke and rotary engine, the combustion chamber does not perform the compression function and therefore, oil contamination is reduced.

The main controller then controls the ignition of the air-fuel mixture in the combustion chamber and the pressure and volume from the combusted gas/air mixture in the combustion chamber flows through a second valve. The combusted gas/air mixture is stored in the high pressure chamber. Pressure remaining in the combustion chamber is evacuated and re-circulated back through to the compressor via a re-circulation valve or the remaining pressure is evacuated to the atmosphere.

Next, liquid from a water injection block is injected into the high pressure chamber to convert an additional amount of the combustion temperature into pressure. The pressure level in the high pressure chamber reservoir is transmitted to the main controller and the main controller controls the regulator to provide a relatively constant regulated pressure in regulated pressure chamber. In one embodiment, for high pressure applications, the water injection may take place in the combustion chamber. In contrast, for lower pressure applications, the water injection takes place in the post-combustion chamber.

The large capacity of the high pressure hot gas stored in the high pressure chamber is used to supply the high pressure gas contained in the regulated pressure chamber. The high pressure gas from the regulated pressure chamber is supplied to the power transfer system. The amount of high pressure gas supplied to the power transfer system is determined by the needs of the power transfer system and conditions such as acceleration or deceleration. The conversion of heat energy into pressure energy reduces the need for a cooling system.

BRIEF DESCRIPTION OF THE DRAWINGS

FIG. 3 is diagram of an illustrative embodiment of an air amplifier of an asynchronous combustion system.

FIG. 4 is block diagram of an illustrative embodiment of an asynchronous combustion system integrated into a turbine engine.

FIG. 5 is block diagram of an illustrative embodiment of an intake section of an asynchronous combustion system integrated into a turbine engine block.

DETAILED DESCRIPTION OF THE INVENTION

Figure 1:
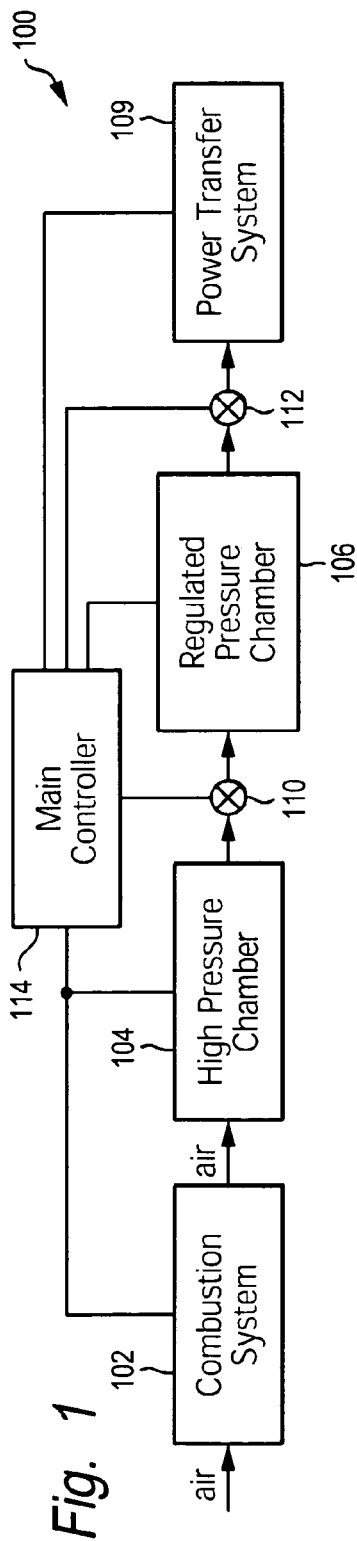
FIG. 1 is a block diagram of an illustrative embodiment of an asynchronous combustion system.

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. The following detailed description is, therefore, not to be taken in a limiting sense, and the scope of the present invention is defined by the appended claims and their equivalents. For clarity of exposition, like features shown in the accompanying drawings are indicated with like reference numerals and similar features as shown in alternate embodiments in the drawings are indicated with similar reference numerals.

Referring to FIG. 1, shown is a simplified block diagram of asynchronous combustion system (ACS) 100. ACS 100 contains combustion system 102, high pressure chamber 104, regulated pressure chamber 106, power transfer system 109, and main controller 114. Combustion system 102 generates a high pressure hot gas and transfers the high pressure hot gas to high pressure chamber 104. High pressure chamber 104 stores the high pressure hot gas generated by combustion system 102 and functions as the source of the high pressure gas used in regulated pressure chamber 106. In an embodiment, high pressure chamber 104 stores a large amount of the high pressure hot gas generated by combustion system 102. Regulated pressure chamber 106 contains high pressure gas and uses the high pressure gas to apply energy to power transfer system 109. Power transfer system 109 uses the high pressure gas created by ACS 100 to power machinery such as a vehicle that contains ACS 100 or to power stationary machinery such as a generators or pumps. Main controller 114 monitors the activity of ACS 100 and adjusts air and fuel flow and other parameters of ACS 100 to obtain various levels of proper combustion and efficiency. In an embodiment, main controller 114 monitors the activity of ACS 100 and adjusts air and fuel flow and other parameters of ACS 100 to obtain optimal or near optimal combustion and efficiency.

Figure 2:
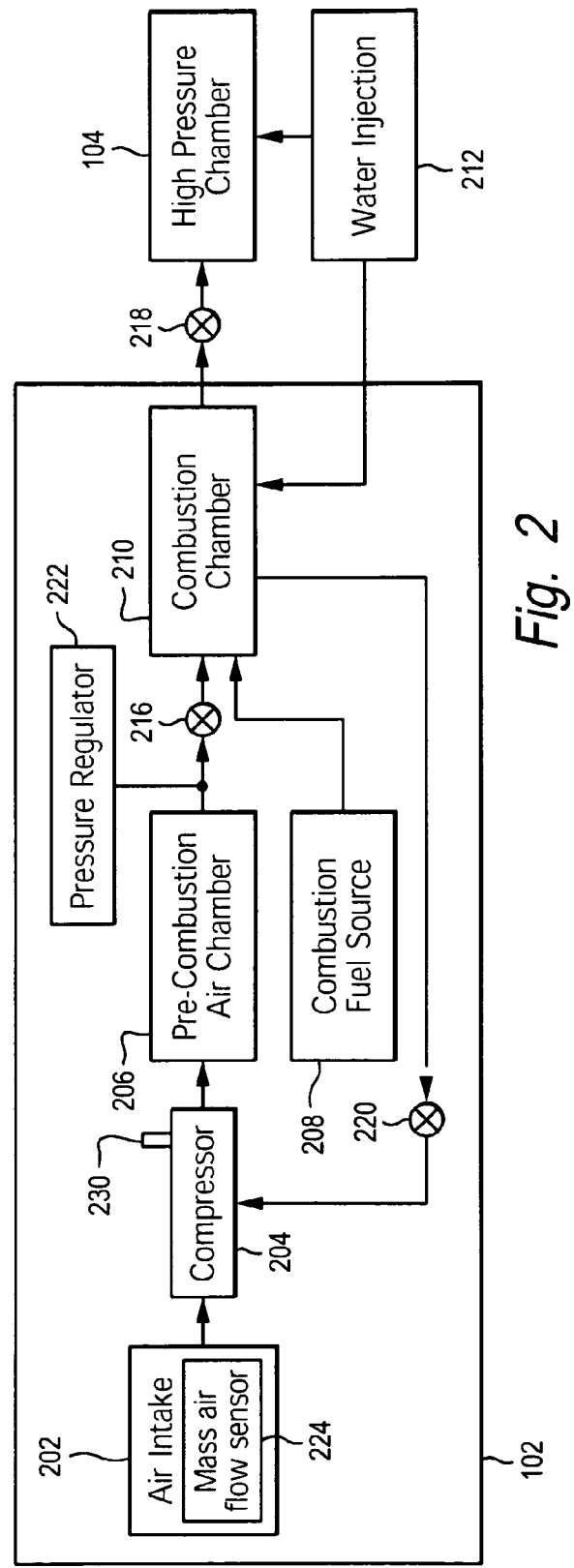
FIG. 2 is a block diagram of an illustrative embodiment of a combustion system of an asynchronous combustion system.

FIG. 2, shows a more detailed view of combustion system 102. Combustion system 102 contains air intake 202, compressor 204, pre-combustion air chamber 206, pressure regulator 222, combustion fuel source 208, and combustion chamber 210. Air intake 202 may be an open element intake system, sealed intake system, ram intake, or other air intake system that can provide sufficient air to operate ACS 100. In one embodiment, air intake 202 contains mass air flow sensor 224. Mass air flow sensor 224 monitors the air flow into air intake 202 and sends the information to main controller 114.

Compressor 204 draws air from air intake 202, compresses the air and transfers the compressed air to pre-combustion air chamber 206. Compressor 204 keeps compressed air in pre-combustion air chamber 206, such that once valve 216 is opened by pressure regulator 222 or in one embodiment, by main controller 114, compressed air is pushed from pre-combustion chamber 206 into combustion chamber 210. In one embodiment, an air amplifier provides positive air pressure to the input of compressor 204.

For example, as shown in FIG. 3, air amplifier 302 is an annular venturi ring. The inlet of air amplifier 302 is supplied with high pressure air by high pressure node 306. High pressure node 306 is located in ACS 100 and may be connected to pre-combustion chamber 206, high pressure chamber 104, regulated high pressure chamber 106, or some other node or nodes in the system capable of supplying high pressure air. High pressure line 308 connects high pressure node 306 to air amplifier 302. The high pressure air in high pressure line 308 can be regulated or controlled by main controller 114 to stabilize or modify the flow of air to air amplifier 302 and, in an embodiment, optimize the performance of air amplifier 302. Air amplifier 302 may be applied to one or more stages of a multi-stage compressor, or other compressor types. In one embodiment, all or part of high pressure line 308 may be cooled by intercooler system 310 such that the high pressure air in high pressure line 308 is cooled before being delivered to air amplifier 302.

Pre-combustion air chamber 206 (FIG. 2) stores the compressed air from compressor 204 until the compressed air is needed by combustion chamber 210. In one embodiment, there is more than one pre-combustion air chamber 206 and each pre-combustion air chamber 206 may function independently or together as a single unit. The amount of pressure in pre-combustion air chamber 206 is determined by the pressure required for combustion. The pressure for combustion includes any 'overhead' required by the pressure regulator being in series with pre-combustion chamber 206 and valve 216. For example, for gasoline combustion, the air pressure in combustion chamber 210, before combustion, might be 10 bar. If the pressure regulator in series with pre-combustion chamber 206 and valve 216 requires a 2 bar differential in order to properly function, then the minimum pressure in pre-combustion air chamber 206 would be at least about 12 bar. In one embodiment, the air mass in pre-combustion chamber 206 is controlled by main controller 114. Main controller 114 monitors and/or calculates the pressure, temperature, and volume of the compressed air in pre-combustion chamber 206 and determines the air mass.

In one embodiment, compressor 204 contains waste gate 230. Waste gate 230 insures the pressure level in pre-combustion air chamber 206 does not exceed a predetermined level. If the pressure in pre-combustion air chamber 206 exceeds a predetermined level, then waste gate 230 is opened to divert the compressor output to the atmosphere in order to decrease the load on compressor 204. In one embodiment, in order to decrease the load on compressor 204 when there is a sufficient amount of compressed air in the pre-combustion air chamber 206a clutch mechanism on the drive shaft of compressor 204 is used to engage or disengage compressor 204. When waste gate 230 is closed, compressor 204 forces air into pre-combustion air chamber 206. The air flow from pre-combustion chamber 206 into combustion chamber 210 is monitored and/or controlled by pressure regulator 222. Pressure regulator 222 may be a fixed regulator or an adjustable, variable pressure regulator in communication with and controlled by main controller 114. In one embodiment, the air flow from pre-combustion chamber 206 into combustion chamber 210 is monitored and/or controlled by main controller 114.

Combustion chamber 210 receives compressed air from pre-combustion air chamber 206 and a combustible fuel from combustion fuel source 208. An ignition source ignites the combustible fuel producing a high pressure hot gas. In a particular embodiment, main controller 114 controls the compression ratio within combustion chamber 210 based on air mass data. Main controller 114 uses pressure regulator 222 to create an air to fuel ratio in combustion chamber 210 by determining how much fuel from combustion fuel source 208 to allow into combustion chamber 210 and if necessary, adjusting the compression ratio within combustion chamber 210. For example, on a system using theoretical 'pure octane' gasoline as the fuel, if pressure regulator 222 detects 2.0 cfs of air going to combustion chamber 210, then main controller 114 would allow 1.52 ml of fuel to enter combustion chamber 210 such that a 14.7:1 stoichiometric air to fuel ratio could be obtained. In one embodiment, main controller 114 determines the ignition spark timing based on the air mass.

After combustion of the fuel, the resulting high pressure hot gas is transferred to high pressure chamber 104 via high pressure gas valve 218. High pressure gas valve 218 may be an actuated valve, or a passive valve such as a Tesla valve-conduit. In one embodiment, pressure remaining in combustion chamber 210 is evacuated and re-circulated back through compressor 204 via re-circulation valve 220. Re-circulation valve 220 may be a passive valve, an active valve, or a sonic choke. In one embodiment, there is more than one combustion chamber 210 and each combustion chamber 210 may function independently or together as a single unit.

High pressure chamber 104 receives and stores the high pressure hot gas created by combustion chamber 210 and functions as the source of the high pressure gas used by regulated pressure chamber 106. In one embodiment, there is more than one high pressure chamber 104 and each high pressure chamber 104 may function independently or together as a single unit.

The amount of pressure in high pressure chamber 104 is determined by the pressure required for operation of power transfer system 109, and the overhead required by regulator 110. For example, if the maximum required operating pressure of power transfer system 109 is about 125 bar, and regulator 110 requires a 2 bar differential in order to properly function, then the minimum pressure in high pressure chamber 104 would be about 127 bar. In one embodiment, regulator 110 is an adjustable regulator.

Main controller 114 monitors the pressure, temperature, and volume of the high pressure gas in high pressure chamber 104. Main controller block 114 adjusts the pressure in regulated pressure chamber 106 by means of regulator 110, based on the derived high pressure gas data and the requirements of the power transfer system. In one embodiment, main controller 114 can control both the volume and pressure in high pressure chamber 106 such that if the temperature in regulated pressure chamber 106 drops, the pressure is increased by decreasing the volume of regulated pressure chamber 106.

In an embodiment, water injection block 212 injects liquid into high pressure chamber 104 in order to convert additional amounts of the combustion temperature into pressure. As an alternative or in combination, water injection block 212 may inject liquid directly into combustion chamber 210. In one embodiment, the injected liquid is pre-heated from heat collected by a water jacket surrounding combustion chamber 210. In another embodiment, the liquid is pre-heated by means of one or more heat exchangers, that derive heat from the exhaust of ACS 100.

Regulator 110, FIG. 1, supplies regulated pressure chamber 106 with high pressure gas from high pressure chamber 104. Regulated pressure chamber 106 contains a large capacity of high pressure gas and, via control valve 112, uses the high pressure gas to apply energy to power transfer system 109. In one embodiment, there is more than one regulated pressure chamber 106 and each regulated pressure chamber 106 may function independently or together as a single unit. If there is more than one regulated pressure chamber 106, each chamber may have a corresponding control valve 112 or each regulated pressure chamber 106 may feed into to a single control valve 112.

In general, the purpose of ACS 100 is to provide a large capacity source of high pressure gas to power transfer system 109 via control valve 112. The high pressure gas is contained in regulated pressure chamber 106. The high pressure gas in regulated pressure chamber 106 is supplied from high pressure chamber 104. When the pressurized gas supplied by high pressure chamber 104 falls below a minimum level, main controller 114 initiates an ignition sequence to activate combustion system 102.

The ignition sequence allows compressed air from pre-combustion air chamber 206 to flow into combustion chamber 210 by means of combustion valve 216. During the same sequence, main controller 114 allows a controlled amount of combustible fuel from combustion fuel source 208 to flow into combustion chamber 210 and main controller 114 controls the operation and timing of the ignition. In addition, main controller 114 controls high pressure gas valve 218 such that the combusted gas in combustion chamber 210 is allowed to flow into high pressure chamber 104. Because compressed air is forced into combustion chamber 210 by combustion valve 216, combustion chamber 210 does not perform the compression function and therefore, the only source of oil contamination is combustion valve 216 and high pressure gas valve 218.

In applications where power transfer system 109 is a four-cycle engine, the function of compressor 104 may be performed by the compression cycle of the engine. A four-cycle engine has an intake valve, exhaust valve, cylinder, and piston. In addition, a typical four-cycle engine has an intake cycle, a compression cycle, a power cycle, and an exhaust cycle. During the intake cycle, the air intake valve is open, and all other valves are closed and uncompressed air is drawn into the cylinder. Then during the compression cycle, the air output valve between the cylinder and pre-combustion chamber 206 is opened, all other valves are closed, and the air that was drawn in during the intake cycle is compressed. During the power cycle, the valve between the regulated pressure chamber 106 and the cylinder is opened, all other valves are closed, and the piston is activated by the pressure from regulated pressure chamber 106. Finally, the exhaust cycle removes the high pressure gas from the cylinder by opening the exhaust valve so that the upward motion of the piston forces the high pressure gas out of the cylinder and the process continues with the intake cycle.

In applications where the power transfer block is a two-cycle engine, during the power cycle, the valve between regulated pressure chamber 106 and the cylinder is opened, the exhaust valve is closed, and the piston is activated by the pressure from regulated pressure chamber 106. Then during the exhaust cycle, the valve between regulated pressure chamber 106 remains closed and the exhaust valve is opened so that the upward motion of the piston forces the gas out of the cylinder.

In applications where the power transfer block is a rotary engine, during the power cycle, pressure from regulated pressure chamber 106 forces the rotor in the rotary engine to rotate. In one embodiment, during the compression cycle, air is forced out of the cylinder and into pre-combustion pressure chamber 206.

In applications where the power transfer block is a turbine engine, the high pressure air is supplied to the turbine via control valve 112. In one embodiment, shown in FIG. 4, ACS 100 is integrated into turbine engine block 400. Turbine engine block 400 contains intake section 402, pressure chamber section 404, and turbine section 406. As shown in FIG. 5, intake section 402 contains compressor 204, pre-combustion air chamber 206, valve conduit 216, and first channel 502.

Compressor 204 draws power from power transfer system 106 and uses the power to rotate compressor blades 504. The rotation of compressor blades 504 draws air from air intake 202 (not shown) towards the center of the compressor blades in compressor 204. The air is then compressed as compressor blades 504 force air from the center of compressor blades 504 towards the outside perimeter of compressor blades 504. From the perimeter of compressor blades 504, air flows into the pre-combustion chamber 206. Next, air flows from pre-combustion chamber 206 to combustion chamber 210 (FIG. 6) via first channel 502. First channel 502 traverses the width of turbine engine block 400 and connects intake section 402 to turbine section 406.

Figure 6:
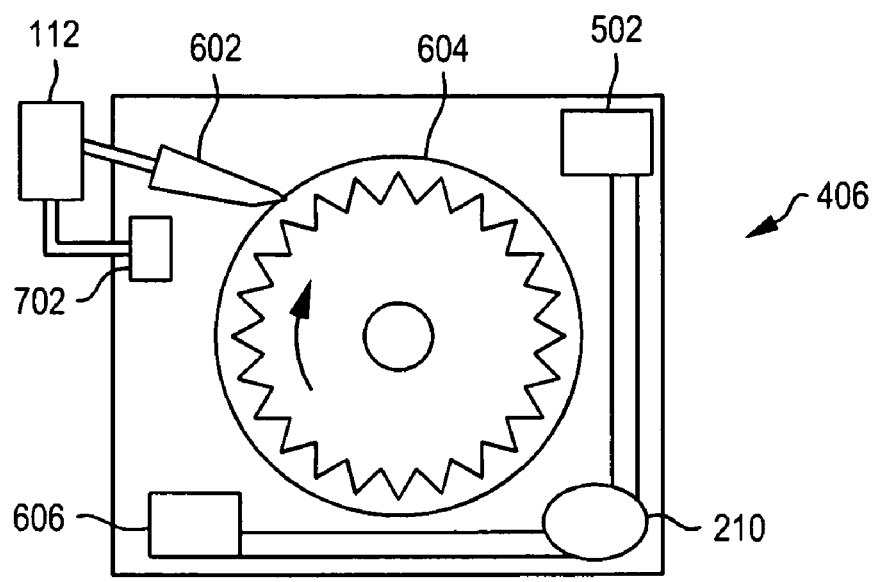
FIG. 6 is block diagram of an illustrative embodiment of a turbine section of an asynchronous combustion system integrated into a turbine engine block.

As shown in FIG. 6, turbine section 406 contains first channel 502, combustion chamber 210, control valve 112, second channel 606, supply channel 702, turbine air conditioner 602, and turbine 604. Combustion chamber 210 receives the compressed air from pre-combustion chamber 206 via first channel 501. After combustion, the hot high pressure gas is delivered to high pressure chamber 104 (FIG. 7) via second channel 606. Second channel 606 connects turbine section 406 to pressure chamber section 404. Control valve 112 receives high pressure gas from regulated pressure chamber 106 via supply channel 702 and regulates the flow of the high pressure gas to turbine air conditioner 602. Turbine air conditioner 602 conditions the hot high pressure gas for use by turbine 604 and in one embodiment turbine air conditioner 602 is a Laval-type nozzle or some other similar nozzle that is capable of delivering a high-velocity stream of gas to the perimeter of turbine 604. Turbine 604 rotates a shaft that supplies power to the load and may be used to drive compressor 204.

Figure 7:
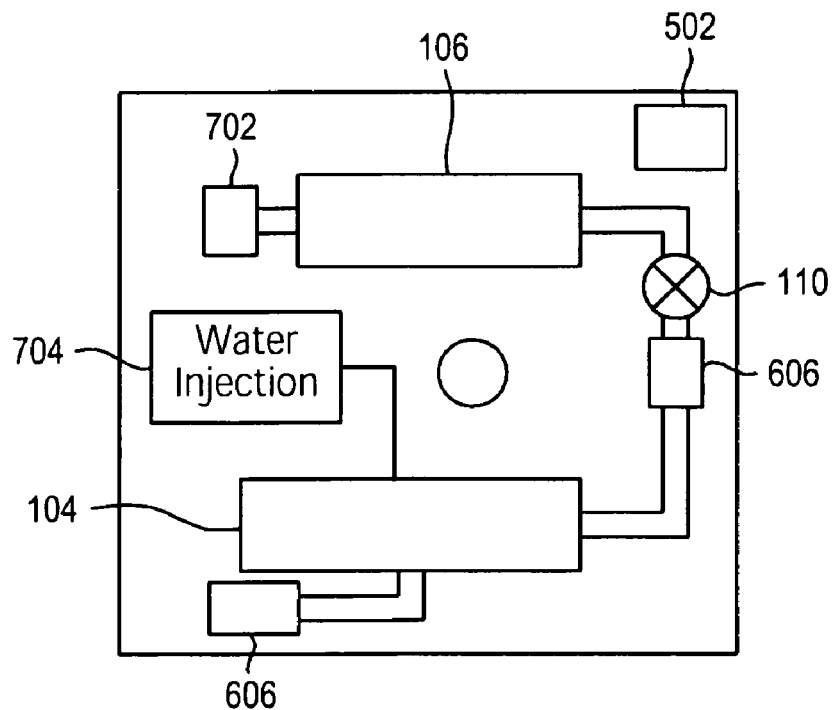
FIG. 7 is block diagram of an illustrative embodiment of a pressure chamber section of an asynchronous combustion system integrated into a turbine engine.

As shown in FIG. 7, pressure chamber section 404 contains first channel 502, second channel 606, high pressure chamber 104, water injection system 704, pressure regulator 110, regulated pressure chamber 106, and supply channel 702. The hot high pressure gas created by combustion chamber 210 in turbine section 406 is delivered to high pressure chamber 104 via second channel 606. High pressure chamber 104 receives and stores the high pressure hot gas created by combustion chamber 214 and functions as the source of the high pressure gas used by regulated pressure chamber 106 via pressure regulator 110. In one embodiment, water injection system 704 is connected to high pressure chamber 104 and injects liquid into high pressure chamber 104 to convert additional amounts of the combustion temperature into pressure. Pressure regulator 110 controls the pressure in the regulated pressure chamber 106 and ensures the high pressure gas contained in regulated pressure chamber 106 is sufficient to supply energy to power turbine 604 via control valve 112. The high pressure gas from pressure regulator 110 is transferred to control valve 112 through supply channel 702.

Figure 8:
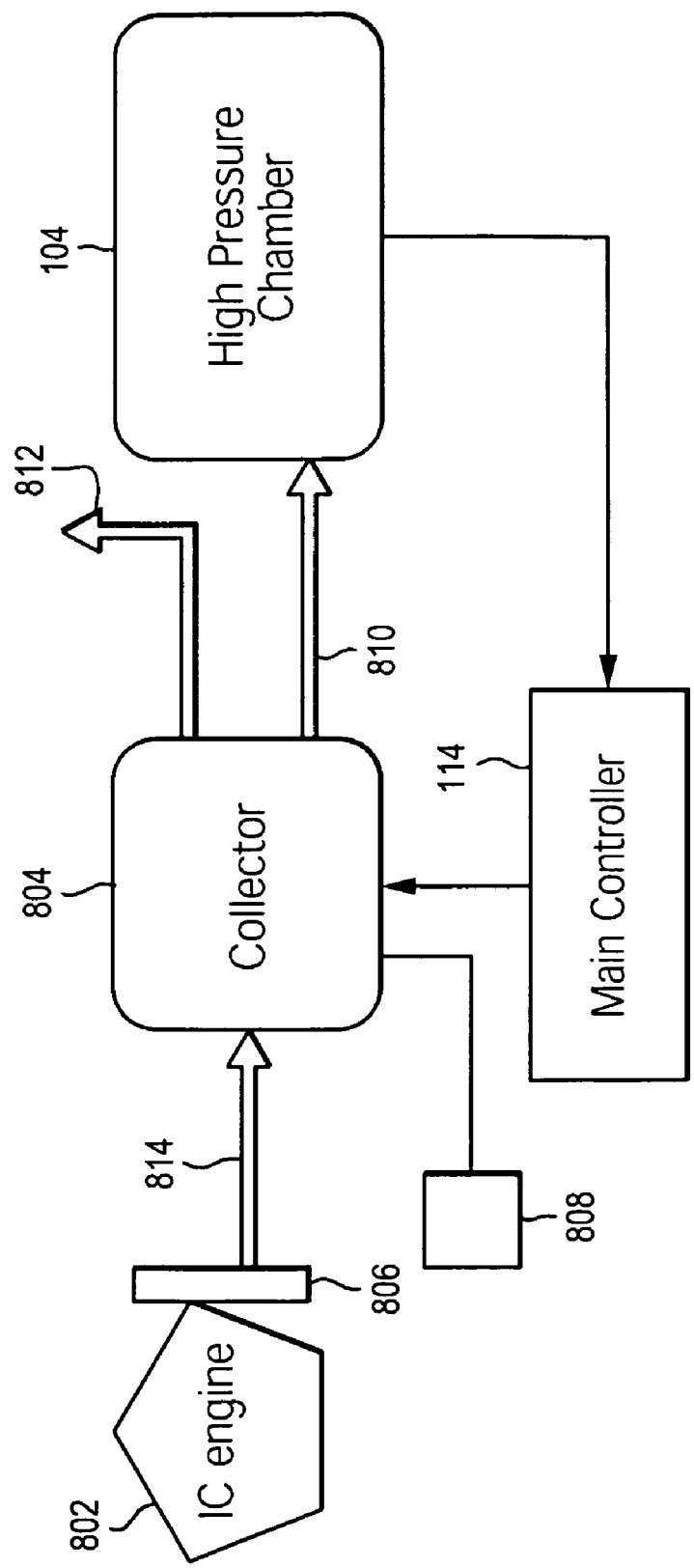
FIG. 8 is a block diagram of an illustrative embodiment of one embodiment of an asynchronous combustion system used in conjunction with an internal combustion engine.

In one embodiment, shown in FIG. 8, combustion system 102 of ACS system 100 is replaced by an internal combustion engine (IC engine) 802. Similar to the combustion system 102, the IC engine 802 provides high temperature gas to high pressure chamber 104. Collector 804 is located between exhaust manifold 806 of IC engine 802, and high pressure chamber 104. Collector 804 receives the hot gas from exhaust manifold 806 of IC engine 802 via collector inlet manifold 814. In one embodiment, collector 804 contains one or more airlocks. In an embodiment, because efficient operation of IC engine 802 typically depends on a low pressure exhaust system, water injector 808 injects water into collector 804 to convert the high temperature low pressure gas inside collector 804 into high pressure gas. The high pressure gas in collector 804 is delivered to high pressure chamber 104 of ACS system 100 via outlet manifold 810. Vent manifold 812 vents any excess pressure directly to the atmosphere. In one embodiment, vent manifold 812 vents any excess pressure through the IC engine 605 exhaust system. Main controller 114 controls the flow of gas into and out of collector 804 and high pressure chamber 104.

Figure 9:
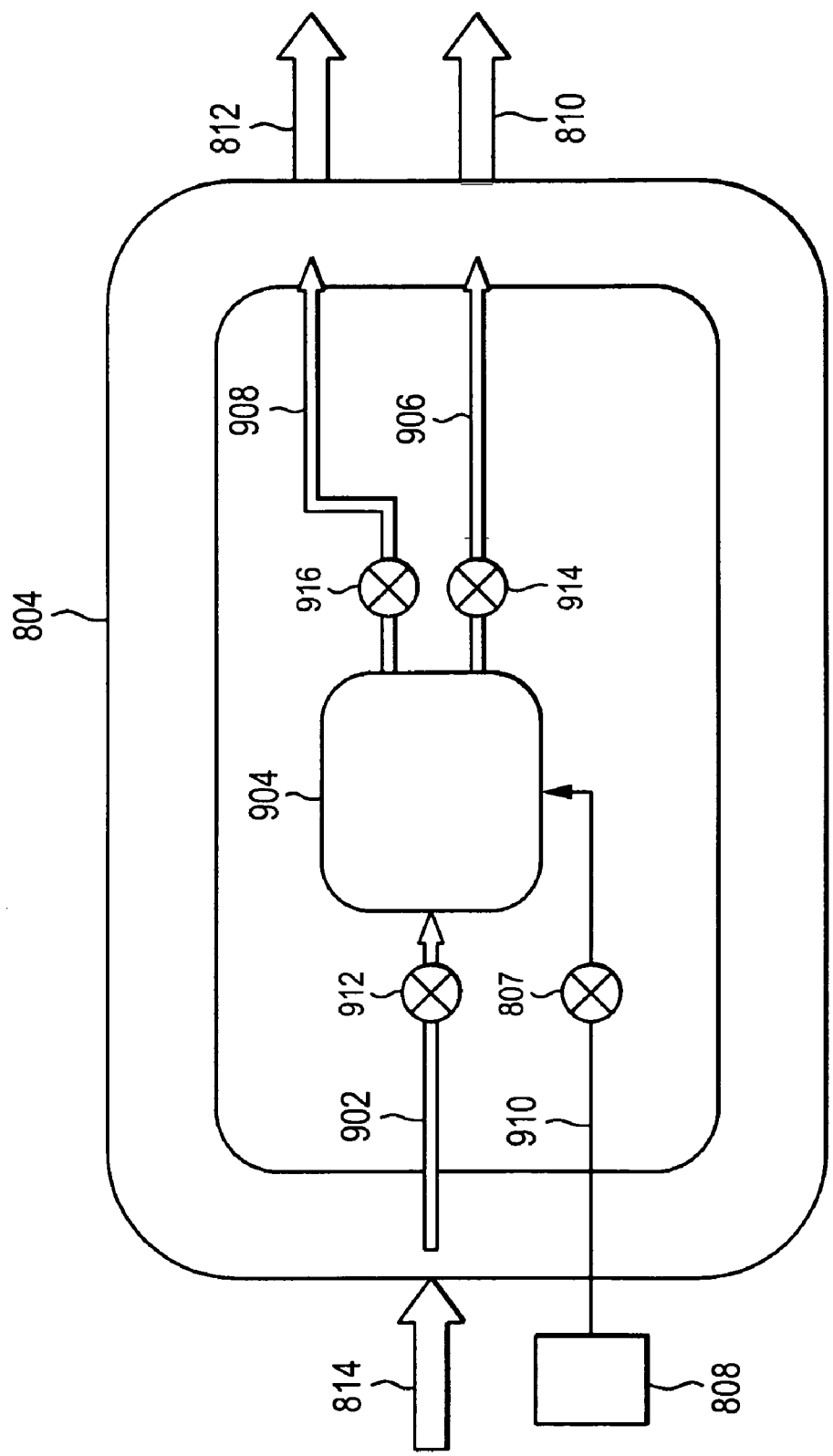
FIG. 9 is a block diagram of an illustrative embodiment of a compressor of an asynchronous combustion system.

As shown in FIG. 9, collector 804 contains chamber intake 902, chamber 904, chamber output 906, vent port 908, and water injection port 910. Chamber intake 902 is connected to collector inlet manifold 814 to receive the exhaust from exhaust manifold 806 of IC engine 802. The exhaust from IC engine 802 is stored in chamber 904. The flow from the exhaust manifold 806 though collector inlet manifold 814 and chamber intake 902 and into chamber 904 is controlled by intake valve 912. In one embodiment intake valve 912 is a unidirectional valve.

Chamber output 906 is connected to output manifold 810. Output manifold 810 is connected to high pressure chamber 104 of ACS system 100 and delivers the high pressure gas in collector 804 to high pressure chamber 104 of ACS system 100. The flow from chamber 904 through chamber output 906 and to output manifold 810 is controlled by output valve 914. In one embodiment output valve 914 is a unidirectional valve.

Vent port 908 is connected to vent manifold 812 and vents any excess pressure directly to the atmosphere. The flow from chamber 904 through vent port 908 and to vent manifold 812 is controlled by vent valve 916. In one embodiment, vent valve 916 is a unidirectional valve.

During operation, main controller 114 closes the output valve 914 and vent valve 916. Then intake valve 912 is opened. Hot exhaust gas from IC engine 802 travels through exhaust manifold 806 and chamber intake 902 and into chamber 904. After chamber 904 has received the hot exhaust gas from the IC engine 802, main controller 114 closes intake valve 912 and opens water injection valve 910 such that the liquid in water injector 808 enters chamber 904. In one embodiment, the liquid in water injector 808 is pre-heated before being delivered into chamber 904. The high temperature gas inside chamber 904 causes the injected water to turn into high pressure steam. After the high pressure steam is generated within the chamber 904, main controller 114 opens output valve 914, which releases the high pressure gas within the chamber 904 into high pressure chamber 102.

Then, main controller 114 closes the output valve 914 after at least a portion of the high pressure gas within the chamber 904 is transferred to the high pressure chamber 102. In one embodiment, main controller 114 opens vent valve 916 and residual high pressure gas remaining in chamber 904 is evacuated through vent manifold 910. After the residual high pressure gas in chamber 904 is evacuated, main controller 114 closes vent valve 916, and the cycle begins again.

Figure 10:
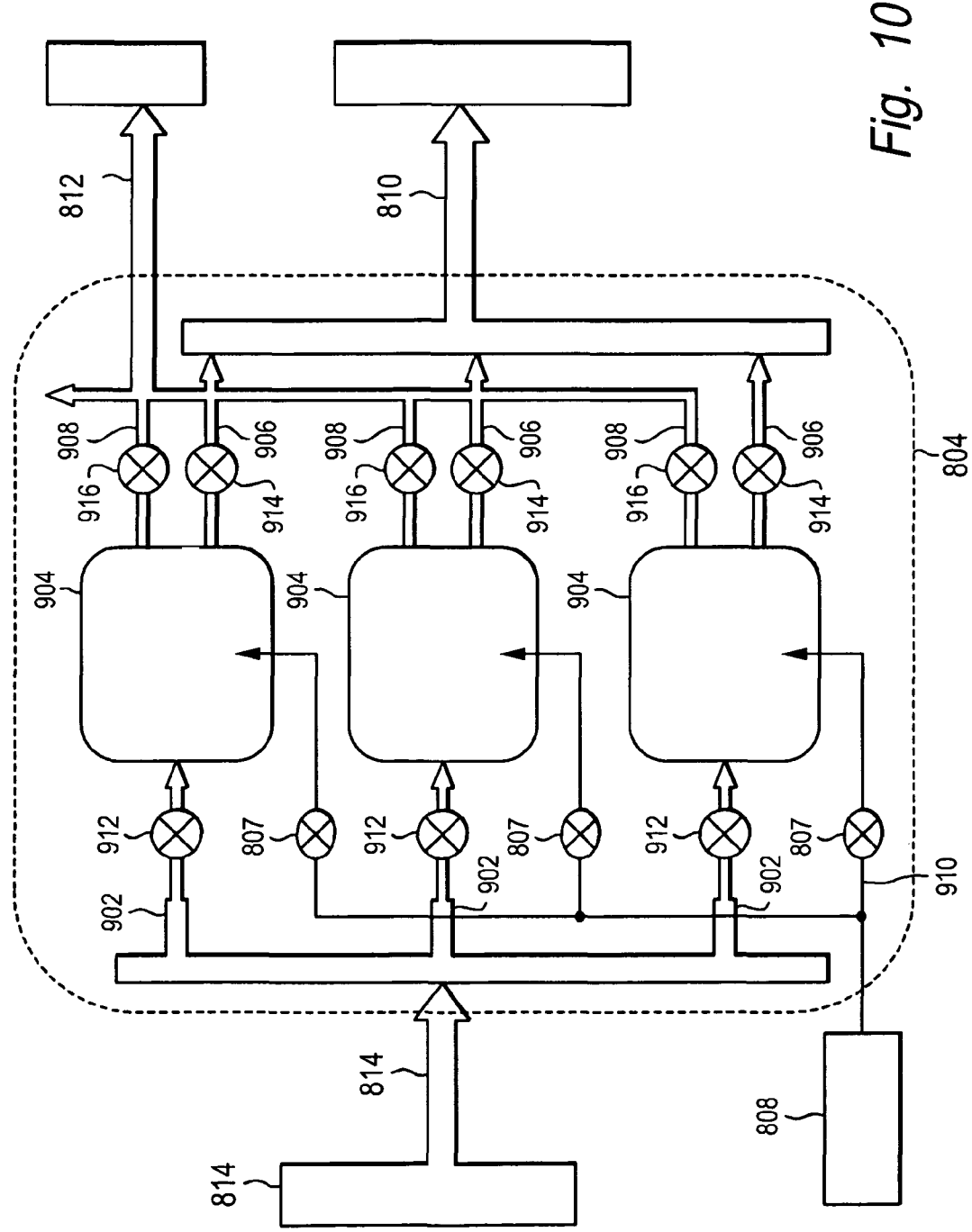
FIG. 10 is a block diagram of an illustrative embodiment of multiple compressors of an asynchronous combustion system.

In one embodiment, shown in FIG. 10, there are a plurality of chambers and each collector chamber operates independently, so that the collector may simultaneously or independently perform any combination of the three modes such as that of intake, expansion, and exhaust. In another embodiment, the plurality of chambers operates collectively.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. An asynchronous combustion system comprising:
a combustion system to generate a high pressure hot gas;
a high pressure chamber to receive the high pressure hot gas generated by combustion system and store a large capacity of the high pressure hot gas;
a regulated pressure chamber to receive the high pressure hot gas from the high pressure chamber and use the high pressure hot gas to apply energy to a power transfer system
a main controller to monitor the combustion system, high pressure chamber, regulated pressure chamber; and
an air amplifier, wherein an inlet of the air amplifier is supplied with high pressure air by a high pressure line connected to a high pressure node, wherein the high pressure air in the high pressure line can be regulated or controlled by the main controller to stabilize or modify the flow of air to air amplifier.

2. The asynchronous combustion system of claim 1 wherein the combustion system contains an air intake to collect air, compressor to compress the collected air, precombustion air chamber to store the compressed air, pressure regulator to regulate the pressure in pre-combustion air chamber, combustion fuel source, combustion chamber to receive the compressed air from pre-combustion air chamber and combustion fuel from combustion fuel source, and an ignition source to ignite the combustible fuel in the combustion chamber to produce a high pressure hot gas.

3. The asynchronous combustion system of claim 2 wherein the air intake is an open element intake system, sealed intake system, or ram intake.

4. The asynchronous combustion system of claim 2 wherein the air intake contains a mass air flow sensor to monitor the air flow into air intake.

5. The asynchronous combustion system of claim 2 further comprising an air amplifier wherein the air amplifier provides positive air pressure to the input of the compressor.

6. The asynchronous combustion system of claim 5 wherein the air amplifier is an annular venturi ring.

7. The asynchronous combustion system of claim 2 wherein the amount of pressure in the pre-combustion air chamber is determined by the pressure required for combustion in the combustion chamber.

8. The asynchronous combustion system of claim 2 further comprising a waste gate to insure the pressure level in the pre-combustion air chamber does not exceed a predetermined level.

9. The asynchronous combustion system of claim 2 wherein any pressure remaining in combustion chamber after is evacuated and re-circulated back to the compressor via a recirculation valve.

10. The asynchronous combustion system of claim 9 wherein the re-circulation valve is a passive valve, an active valve, or a sonic choke.

11. The asynchronous combustion system of claim 2 wherein the amount of pressure in the high pressure chamber is determined by the maximum pressure required for the operation of the power transfer system.

12. The asynchronous combustion system of claim 2 wherein the injected liquid is pre-heated by means of a water jacket surrounding combustion chamber or by one or more heat exchangers that derive heat from the exhaust of the system.

13. The asynchronous combustion system of claim 2 further comprising a water injection block wherein the water injection block injects liquid directly into combustion chamber.

14. An asynchronous combustion system comprising:
an intake to draw in air;
a compressor to compress the air received from the intake;
a pre-combustion air chamber to store the air compressed by the compressor;
a valve conduit to control the flow of the compressed air in pre-combustion air chamber to a combustion chamber wherein the air flows via a first channel, wherein the pressure chamber comprises:
a portion of the first channel;
a second channel to transfer high pressure hot gas created by the combustion chamber to a high pressure chamber, wherein the high pressure chamber stores the high pressure hot gas created by the combustion chamber and functions as the source of the high pressure gas used by a regulated pressure chamber wherein the regulated pressure chamber contains; and
a pressure regulator;
the regulated pressure chamber;
a supply channel to transfer the high pressure gas from the pressure regulator to a control valve wherein the control valve is used to supply energy to power a turbine;
a water injection system contained in pressure chamber section wherein the water injection system is connected to the high pressure chamber and injects liquid into the high pressure chamber to convert an additional amount of the combustion temperature into pressure; and
a turbine section wherein the turbine section contains:
a portion of the first channel;
the combustion chamber to receive the compressed air from pre-combustion air chamber and combustion fuel from combustion fuel source, and an ignition source to ignite the combustible fuel in the combustion chamber to produce a high pressure hot gas;
the second channel;
the supply channel; and
the turbine.

15. The asynchronous combustion system of claim 14 wherein the compressor draws power from the power transfer system and uses the power to rotate compressor blades such that the rotation of compressor blades draws in air from an air intake towards the center of the compressor blades and then compresses the air as the compressor blades force air from the center of the compressor blades towards the outside perimeter of the compressor blades.

16. The asynchronous combustion system of claim 14 further comprising a control valve that receives the high pressure gas from the regulated pressure chamber via the supply channel and regulates the flow of the high pressure gas to a turbine air conditioner wherein the turbine air conditioner conditions the hot high pressure gas for optimal use by the turbine.

17. The asynchronous combustion system of claim 14 wherein the turbine air conditioner is a Laval-type nozzle that is capable of delivering a high-velocity stream of gas to the perimeter of turbine.

18. An asynchronous combustion system comprising:
a combustion system to generate a high pressure hot gas;
a high pressure chamber to receive the high pressure hot gas generated by combustion system and store a large capacity of the high pressure hot gas;
a regulated pressure chamber to receive the high pressure hot gas from the high pressure chamber and use the high pressure hot gas to apply energy to a power transfer system wherein the power transfer system uses the high pressure hot gas to power machinery;
a main controller to monitors the combustion system, high pressure chamber, regulated pressure chamber, and adjusts air and fuel flow; and
a water injection block wherein the water injection block injects liquid into the high pressure chamber to convert an additional amount of the combustion temperature in the high pressure chamber into pressure.

\* \* \* \* \*